Dec. 25, 1951 F. A. C. LORZA 2,579,684

STATION-INDICATING SYSTEM FOR RADIO-GRAMOPHONES COMPRISING MECHANISM FOR ALLOWING THE TURNTABLE TO MOVE OUTWARDS

Filed Oct. 25, 1948

INVENTOR.
FERNANDO A. CANADA LORZA
BY Fred M. Vogel
AGENT.

Patented Dec. 25, 1951

2,579,684

UNITED STATES PATENT OFFICE 2,579,684

STATION-INDICATING SYSTEM FOR RADIO-GRAMOPHONES COMPRISING MECHANISM FOR ALLOWING THE TURNTABLE TO MOVE OUTWARDS

Fernando A. Cañada Lorza, Madrid, Spain, assignor to Hartford National Bank and Trust Company, Hartford, Conn., as trustee Application October 25, 1948, Serial No. 56,454
In Spain January 30, 1948

3 Claims. (Cl. 179—100.11)

The invention relates to radio-gramophones of the kind comprising a slidable turntable, in which the aperture through which the turntable is adapted to be moved into and out of the cabinet, is adapted to be closed by a swing panel.

In known devices of this kind the turntable and its motor are housed over, under or at the side of the radio part of the apparatus with the result that the assembly is comparatively bulky and this is frequently undesirable.

According to the invention, this disadvantage is mitigated in that the tuning dial of the receiver is provided on the swing panel which shuts off the turntable. In a preferred embodiment of the invention, for example, the dial is arranged over the receiver chassis and the loudspeaker, the turntable being accommodated in the space at the back of the dial in the upper part of the apparatus cabinet. This permits of the dimensions of the apparatus being substantially equal to those of a radio receiver without gramophone.

It may be noted that an accommodation of this kind is known per se (German Patent Specification 655,153) but in conjunction with a tiltable lid or cover for the gramophone, the tuning dial being secured to the lid. Inherent in this device are various disadvantages: the tiltable lid is not suitable for supporting, for example, gramophone records or ornamental objects, and structurally, the drive of the dial pointer is difficult to realise, since the dial plate follows the upward movement of the front side of the lid on the latter being raised.

In order that the invention may be more clearly understood and readily carried into effect, it will now be described more fully with reference to the accompanying drawing, in which one embodiment of the invention is diagrammatically shown, by way of example.

Figure 1:
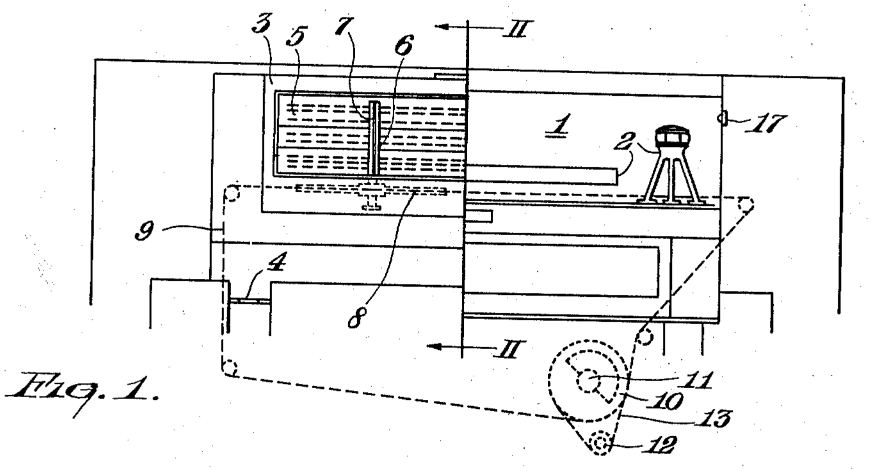
Fig. 1 is an elevation of the front part of a radio-gramophone according to the invention.
Figures 2, 3A, 3B, 3C, 3D:
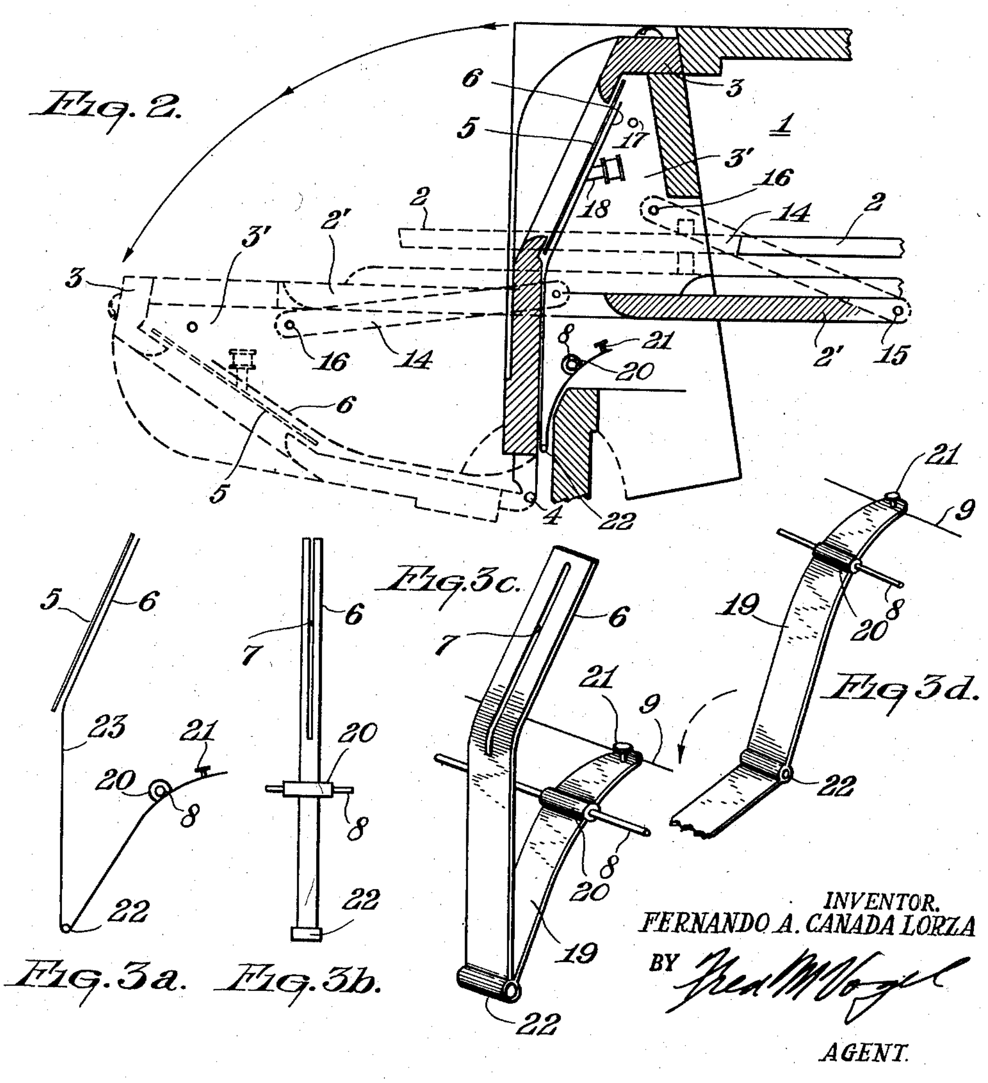
Fig. 2 is a cross-sectional view thereof taken on the line II—II of Fig. 1.

Figs. 3*a* to 3*d* are various views of the pointer and mounting thereof shown on an enlarged scale: Fig. 3*a* being a side view thereof in the operative position; Fig. 3*b* a front view, Fig. 3*c* a perspective view; and Fig. 3*d* a similar perspective view with the pointer moved to inoperative position.

The apparatus by itself may be of any conventional form. Its upper part comprises a space 1, in which the record-playing device (turntable) 2 is accommodated and which is shut by a swing panel 3 which is pivotally attached to horizontal hinges 4. This swing panel supports a glass plate 5, which is provided in the usual manner with a station dial.

The rear side of the glass plate 5 is engaged by a pointer 6 constituted by a flexible arm or strip of sheet metal and provided with an index line 7. This pointer is adapted to move parallel to itself along a guide bar 8 housed within the cabinet of the apparatus. The sliding movement of the pointer is effected with the use of a rope 9, which is secured to the pointer in a manner described hereinafter, and wound on a pulley 10 seated on the shaft 11 of the tuning condenser of the receiver. This condenser is operated by a control knob 12, for example, with the use of a rope transmission 13.

The swing panel 3 which supports the glass plate, is provided at each end with a strip-like coupling member 14 pivoted to points 15 and 16 located on a side element 3′ of panel 3 and on turntable support 2′, respectively. In such manner the record-playing system is caused to move out when the panel is opened. In addition, the swing panel is provided on each side with a switch 17 for the dial illumination lamps 18, so that while the radio part is playing the station dial is continuously illuminated, said lamps extinguishing, however, on the swing panel being opened for operating the turntable.

Figs. 3*a* to 3*d* are detail views of the pointer construction. As shown therein, the pointer 6 is supported by a rigid metal member 19, which has firmly secured thereto a sleeve or guide shoe 20 adapted to slide along the bar 8, so that the pointer 6 is adapted to move parallel along the said bar. The member 19 is provided with a screw 21 for securing the rope 9, by which the pointer may be moved upon manipulation of control knob 12 in the manner described above. The lower part of the member 19 is secured by a hinge, pivoted on a spindle 22, to a supporting member 23, which supports the pointer 6 proper and is subjected to the action of a spring (not shown) provided in the hinge 22, so that the pointer 6 is urged against the rear side of the glass plate 5 in any position of the dial.

When the radio receiver operates as such, the dial plate 5 occupies its closed position and its illumination is switched on. The pointer 6 is adapted to be moved at will with the use of the tuning knob 12, as described previously. If, on the contrary, it is desired to use the gramophone, it is only necessary to open the swing panel 3, upon which the dial-illumination lamps 18 extinguish and the device 2′ housed in the cabinet moves the record-playing device 2 so far out of the cabinet that it is readily accessible. Closure of the swing panel 3 results in the dial returning to its normal position.

What I claim is:

1. In combination; a cabinet having an open-sided gramaphone chamber therein in the upper part thereof, a movable turntable housed in said gramophone chamber, a movable closure for said open-sided chamber, a radio receiver fixedly housed in the lower part of said cabinet, tuning control knob means for said radio receiver mounted on said cabinet, means connected to said movable closure and to said movable turntable for causing the latter to protrude through the open side of said gramophone chamber when said movable closure is moved to open position, a tuning dial mounted on said closure for movement therewith, a movable indicating pointer mounted in continuously operative relationship with said tuning dial in all positions thereof and means connecting said movable indicating pointer to said tuning control knob means for actuation thereby.

2. In combination; a cabinet having an open-sided gramophone chamber therein in the upper part thereof, a movable turntable housed in said gramophone chamber, a movable closure for said open-sided chamber, a radio receiver fixedly housed in the lower part of said cabinet, tuning control knob means for said radio receiver mounted on said cabinet, means connected to said movable closure and to said movable turntable for causing the latter to protrude through the open side of said gramophone chamber when said movable closure is moved to open position, a tuning dial plate mounted on said closure for movement therewith, a movable indicating pointer mounted in operative relationship with said tuning dial plate, said pointer comprising two relatively articulated parts, a guide bar mounted in said cabinet, one of said pointer parts being movably mounted on said guide bar, resilient means on said one pointer part for biasing said other pointer part towards continuous engagement with the rear of said tuning dial plate, and means connecting said one of said pointer parts to said tuning control knob means for actuation thereby.

3. In combination; a cabinet having an open-sided gramophone chamber therein in the upper part thereof, a movable turntable housed in said gramophone chamber, a movable closure for said open-sided chamber hingedly connected to said cabinet, a radio receiver fixedly housed in the lower part of said cabinet, tuning control knob means for said radio receiver mounted on said cabinet, means connected to said movable closure and to said movable turntable for causing the latter to protrude through the open side of said gramophone chamber when said movable closure is swung to open position, a tuning dial plate mounted on said closure for movement therewith, a movable indicating pointer mounted in operative relationship with said tuning dial plate, said pointer comprising two relatively articulated parts, a guide bar mounted in said cabinet, one of said pointer parts being movably mounted on said guide bar, resilient means on said one pointer part for biasing said other pointer part towards continuous engagement with the rear of said tuning dial plate, and cable means connecting said one of said pointer parts to said tuning control knob means for actuation thereby.

FERNANDO A. CAÑADA LORZA.

REFERENCES CITED

The following references are of record in the file of this patent:

UNITED STATES PATENTS

| Number | Name | Date |
|---|---|---|
| 1,642,905 | Sugden | Sept. 20, 1927 |
| 2,247,171 | Harman | June 24, 1941 |

OTHER REFERENCES

Radio and Television Retailing, September 1947, pages 46 and 47.